May 21, 1957  J. FINN  2,792,800
WAVE-ACTUATED DRAG
Filed Sept. 10, 1954

INVENTOR.
John Finn
BY
Att'y

United States Patent Office 2,792,800
Patented May 21, 1957

2,792,800

WAVE-ACTUATED DRAG

John Finn, San Francisco, Calif., assignor to Finn Enterprises, a corporation of California Application September 10, 1954, Serial No. 455,313

2 Claims. (Cl. 115—.5)

This invention relates to improvements in a wave-actuated drag.

The principal object of this invention is to provide a device for pulling or dragging a line, trap, or the like, to a remote point distant from the shore through the action of waves and undertow resulting therefrom.

A further object is to produce a device wherein the undertow will rotate an impeller to move a drag forwardly.

A still further object is to produce a device of this character which is economical to manufacture, easy to transport and simple to use.

Other objects and advantages will be apparent during the course of the following description.

Figure 1:
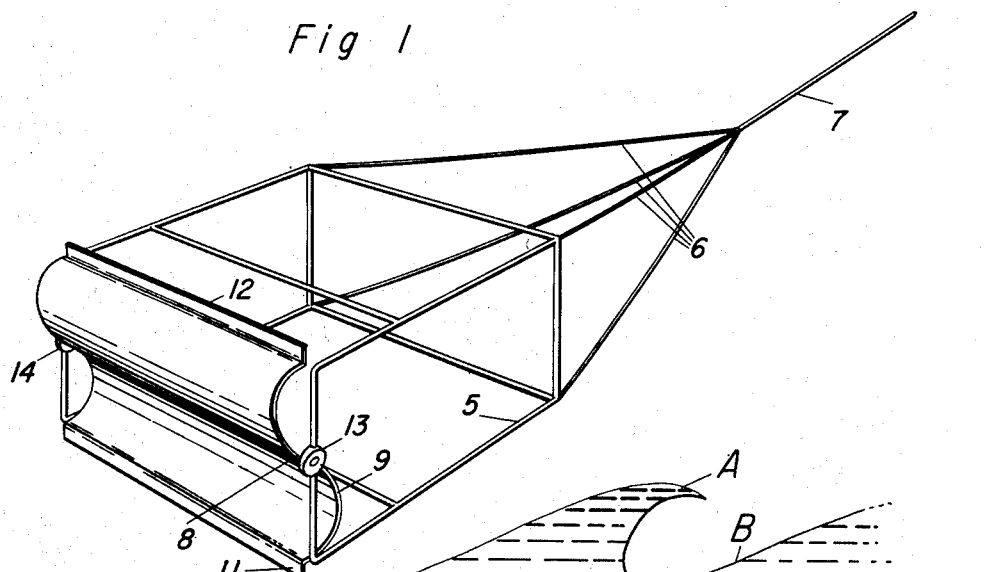
Figure 2:
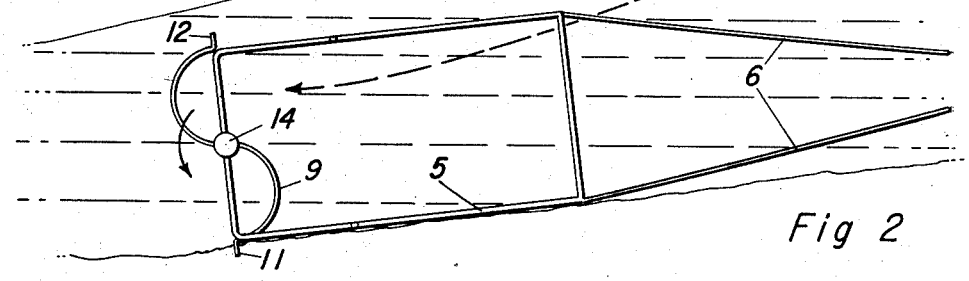
Figure 3:
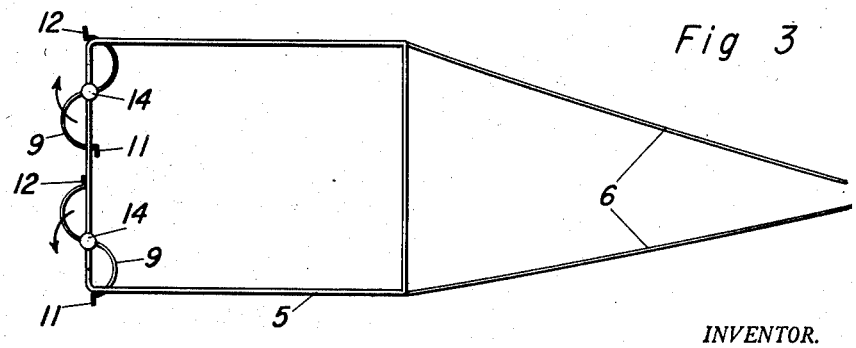

In the accompanying drawings forming a part of this specification and in which like numbers are employed to designate like parts throughout the same, Fig. 1 is a perspective view of my drag;

Fig. 2 is a side elevation thereof, showing the manner in which the device moves over the surface of the beach beneath the water; and Fig. 3 is a modified form of my device.

Adjacent all beaches there is more or less wave action, particularly during storms and changes of the tide. Also, at ocean beaches there is always considerable wave action, which results in a so-called undertow, which undertow is caused by the waves breaking and then washing up on the shore and then in receding. This receding water hugs the ground or beach causing an under-current for a considerable distance off shore beneath the incoming wave action.

It is this undertow that I employ to cause my drag to move outwardly away from the shore line.

In the accompanying drawings, wherein for the purpose of illustration is shown a preferred embodiment of my invention, the numeral 5 designates a substantially rectangular frame to which a plurality of harness lines 6 are attached, which harness lines are in turn connected to a drag line 7.

Pivotally mounted in the frame 5 on a cross rod 8 is a vane 9 which vane in cross section is substantially S-shaped, and has outwardly extending blades 11 and 12. Spacers are shown at 13 and 14 which serve to prevent the blade from engaging the side rods of the frame.

In the modified form shown in Fig. 3 it will be noted that I have provided two blades, one above the other. The curvature of these two blades is reversed with respect to each other, otherwise they are identically like the blade described in Figs. 1 and 2, and therefore bear the same numerals.

The result of the construction described above is that when my drag is placed in the water adjacent the shore line, the action of the incoming waves will be as shown in Fig. 2, wherein the wave crest as shown at A breaks and flows upwardly on to the beach. This water then recedes as shown by the arrow B, passing beneath the next oncoming wave. This receding water or undertow will follow the course shown by the dotted arrow, impinging on the top of the vane 9, causing it to rotate on its shaft 8, with the result that the blade 11 will dig into the sand, slightly raising the frame 5 and will move the same forward.

As this vane will revolve quite rapidly, each time one of the blades 11 or 12 engages the ground, the frame will be lifted and moved forward with a slight skipping motion, thus working the drag line outwardly away from the shore.

To this drag line may be connected a fishing line, a fish trap, or any other paraphernalia which it is desired to work out from shore.

This undertow, it has been found from experience, may extend several hundred feet off shore and consequently the drag will move outwardly for a considerable distance.

In the modified form shown in Fig. 3, the action is the same, with the exception that only the bottom vane actuates the drag, the upper vane merely rotating freely.

Should the whole device turn upside down for any reason, then the upper vane would become the working vane to further move the device forward.

It is to be understood that the form of my invention herewith shown and described is to be taken as a preferred example of the same and that various changes relative to the material, size, shape and arrangement of parts may be resorted to without departing from the spirit of the invention or the scope of the subjoined claims.

Having thus described my invention, I claim:

1. In a device of the character described, a substantially rectangular frame of open rod-like construction and including laterally opposed upright members at the front end thereof, a shaft extending transversely of the frame and having the opposite ends thereof secured to said upright members, an impeller vane of generally rectangular form in plan disposed between the sides of said frame and rotatably secured to said shaft in a line intermediate of and parallel to the opposite horizontal edges of the vane, and said vane being of generally ogee form in cross-section and including ground engaging opposite edge portions in a plane of said shaft.

2. The structure according to claim 1, together with a plurality of harness lines projecting rearwardly from the frame in converging relation one from each rear corner thereof, and a drag line having an end thereof secured to the meeting ends of said harness lines.

References Cited in the file of this patent

UNITED STATES PATENTS

| | | |
|---|---|---|
| 1,157,922 | Bassett | Oct. 26, 1915 |
| 1,276,667 | McDonald | Aug. 20, 1918 |
| 2,432,107 | Williams | Dec. 9, 1947 |
| 2,509,323 | Underhill | May 30, 1950 |